(12) United States Patent
Potnis

(10) Patent No.: US 7,226,880 B2
(45) Date of Patent: Jun. 5, 2007

(54) BREATHABLE, EXTENSIBLE FILMS MADE WITH TWO-COMPONENT SINGLE RESINS

(75) Inventor: Prasad Shrikirshna Potnis, Duluth, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 458 days.

(21) Appl. No.: 10/335,244

(22) Filed: Dec. 31, 2002

(65) Prior Publication Data

US 2004/0127131 A1 Jul. 1, 2004

(51) Int. Cl.
*B32B 27/12* (2006.01)

(52) U.S. Cl. .................. 442/498; 524/427; 525/70; 525/240; 526/348.1

(58) Field of Classification Search .......... 442/398; 428/308.4, 304.4, 317.9, 318.4, 515, 523, 428/910; 524/427; 526/348.1; 525/70, 240
See application file for complete search history.

(56) References Cited

U.S. PATENT DOCUMENTS

| | | | |
|---|---|---|---|
| 3,233,029 A | | 2/1966 | Rasmussen |
| 3,338,992 A | * | 8/1967 | George .................. 264/441 |
| 3,341,394 A | * | 9/1967 | George .................. 442/366 |
| 3,383,449 A | | 5/1968 | Mëller |
| 3,502,538 A | * | 3/1970 | Petersen .................. 428/359 |
| 3,502,763 A | * | 3/1970 | Hartmann .................. 264/555 |
| 3,542,615 A | * | 11/1970 | Dobo et al. .................. 156/181 |
| 3,692,618 A | * | 9/1972 | Doishner .................. 442/401 |
| 3,761,348 A | | 9/1973 | Chamberlin |
| 3,802,817 A | * | 4/1974 | Matsuki et al. .................. 425/66 |
| 3,839,240 A | | 10/1974 | Zimmerman |
| 3,844,865 A | | 10/1974 | Elton et al. |
| 3,849,241 A | * | 11/1974 | Butin et al. .................. 428/137 |
| 3,849,526 A | | 11/1974 | Muller et al. |
| 3,988,883 A | | 11/1976 | Sze |
| 4,106,313 A | | 8/1978 | Boe |
| 4,136,218 A | | 1/1979 | Nischwitz et al. |
| 4,138,459 A | | 2/1979 | Brazinsky et al. |
| 4,243,802 A | | 1/1981 | Landoll |
| 4,289,832 A | | 9/1981 | Schwarz |
| 4,301,102 A | | 11/1981 | Fernstrom et al. |
| 4,336,638 A | | 6/1982 | Mercer |
| 4,340,563 A | * | 7/1982 | Appel et al. ................. 264/518 |
| 4,350,655 A | | 9/1982 | Hoge |
| 4,374,175 A | | 2/1983 | Tanaka |
| 4,384,023 A | | 5/1983 | Okamura et al. |
| 4,405,686 A | | 9/1983 | Kuroda et al. |
| 4,424,257 A | | 1/1984 | Bach |
| 4,438,167 A | | 3/1984 | Schwarz |
| 4,464,815 A | | 8/1984 | Canterino et al. |
| 4,521,484 A | | 6/1985 | Li |
| 4,563,229 A | | 1/1986 | Sorez |
| 4,590,124 A | | 5/1986 | Schoenberg |
| 4,613,643 A | | 9/1986 | Nakamura et al. |
| 4,698,372 A | | 10/1987 | Moss |
| 4,701,432 A | * | 10/1987 | Welborn, Jr. ................. 502/113 |
| 4,820,590 A | | 4/1989 | Hodgson, Jr. et al. |
| 4,833,172 A | | 5/1989 | Schwarz et al. |
| 4,861,660 A | | 8/1989 | Ishii |
| 4,867,881 A | | 9/1989 | Kinzer |
| 4,877,679 A | | 10/1989 | Leatherman et al. |
| 4,965,122 A | * | 10/1990 | Morman ..................... 442/328 |
| 4,972,522 A | | 11/1990 | Rautenberg |
| 4,981,747 A | | 1/1991 | Morman |
| 4,994,335 A | | 2/1991 | Kamaei et al. |
| 5,073,316 A | | 12/1991 | Bizen et al. |
| 5,120,594 A | | 6/1992 | Mrozinski |
| 5,143,679 A | | 9/1992 | Weber et al. |
| 5,153,254 A | | 10/1992 | Chen |
| 5,169,712 A | | 12/1992 | Tapp |
| 5,226,992 A | | 7/1993 | Morman |
| 5,238,623 A | | 8/1993 | Mrozinski |
| 5,256,231 A | | 10/1993 | Gorman et al. |
| 5,256,417 A | | 10/1993 | Koltisko |
| 5,296,184 A | | 3/1994 | Wu et al. |
| 5,304,599 A | | 4/1994 | Himes |
| 5,352,518 A | | 10/1994 | Muramoto et al. |
| 5,370,940 A | * | 12/1994 | Hazlitt et al. ................. 428/516 |
| 5,376,430 A | | 12/1994 | Swenson et al. |
| 5,380,313 A | | 1/1995 | Goulait et al. |
| 5,380,578 A | | 1/1995 | Rautenberg |
| 5,395,810 A | * | 3/1995 | Shamshoum et al. ....... 502/113 |

| | | | |
|---|---|---|---|
| 5,405,887 A | 4/1995 | Morita et al. | |
| 5,411,636 A | 5/1995 | Hermans et al. | |
| 5,418,045 A | 5/1995 | Pike et al. | |
| 5,424,025 A | 6/1995 | Hanschen et al. | |
| 5,425,987 A | 6/1995 | Shawver et al. | |
| 5,429,856 A | 7/1995 | Krueger et al. | |
| 5,456,982 A | 10/1995 | Hansen et al. | |
| 5,468,702 A * | 11/1995 | Jejelowo | 502/104 |
| 5,492,598 A | 2/1996 | Hermans et al. | |
| 5,501,679 A | 3/1996 | Krueger et al. | |
| RE35,206 E | 4/1996 | Hassenboehler, Jr. et al. | |
| 5,514,470 A | 5/1996 | Haffner et al. | |
| 5,514,634 A * | 5/1996 | Hagerty et al. | 502/125 |
| 5,527,752 A * | 6/1996 | Reichle et al. | 502/117 |
| 5,576,374 A * | 11/1996 | Betso et al. | 524/451 |
| 5,599,420 A | 2/1997 | Yeo et al. | |
| 5,604,036 A | 2/1997 | Price et al. | |
| 5,614,281 A | 3/1997 | Jackson et al. | |
| 5,624,427 A | 4/1997 | Bergman et al. | |
| 5,643,846 A * | 7/1997 | Reddy et al. | 502/104 |
| 5,648,428 A * | 7/1997 | Reddy et al. | 526/116 |
| 5,651,853 A | 7/1997 | Wrigley et al. | |
| 5,661,096 A * | 8/1997 | Winter et al. | 502/103 |
| 5,665,083 A | 9/1997 | Igaue et al. | |
| 5,695,376 A | 12/1997 | Datta et al. | |
| 5,695,377 A | 12/1997 | Triebes et al. | |
| 5,707,468 A | 1/1998 | Arnold et al. | |
| 5,735,840 A | 4/1998 | Kline et al. | |
| 5,743,999 A | 4/1998 | Kamps et al. | |
| 5,747,405 A * | 5/1998 | Little et al. | 502/113 |
| 5,758,842 A | 6/1998 | Dorfel et al. | |
| 5,763,334 A | 6/1998 | Gupta et al. | |
| 5,770,531 A | 6/1998 | Sudduth et al. | |
| 5,789,065 A | 8/1998 | Haffner et al. | |
| 5,804,524 A * | 9/1998 | Reddy et al. | 502/113 |
| 5,814,390 A | 9/1998 | Stokes et al. | |
| 5,814,567 A | 9/1998 | Yahiaoui et al. | |
| 5,846,365 A | 12/1998 | Kline et al. | |
| 5,853,635 A | 12/1998 | Morell et al. | |
| 5,853,638 A | 12/1998 | Han | |
| 5,883,028 A | 3/1999 | Morman et al. | |
| 5,885,908 A | 3/1999 | Jaeger et al. | |
| 5,888,607 A | 3/1999 | Seth et al. | |
| 5,914,084 A | 6/1999 | Benson et al. | |
| 5,928,212 A | 7/1999 | Kline et al. | |
| 5,945,175 A | 8/1999 | Yahiaoui et al. | |
| 5,972,502 A | 10/1999 | Jessee et al. | |
| 6,017,832 A | 1/2000 | Yahiaoui et al. | |
| 6,028,016 A | 2/2000 | Yahiaoui et al. | |
| 6,037,417 A * | 3/2000 | Nguyen et al. | 525/240 |
| 6,054,002 A | 4/2000 | Griesbach, III et al. | |
| 6,072,005 A * | 6/2000 | Kobylivker et al. | 525/240 |
| 6,096,014 A | 8/2000 | Haffner et al. | |
| 6,106,956 A * | 8/2000 | Heyn et al. | 428/516 |
| 6,169,045 B1 | 1/2001 | Pike et al. | |
| 6,172,177 B1 | 1/2001 | Wang et al. | |
| 6,204,208 B1 | 3/2001 | Krzysik et al. | |
| 6,225,243 B1 | 5/2001 | Austin | |
| 6,242,041 B1 | 6/2001 | Katoot et al. | |
| 6,242,084 B1 * | 6/2001 | Peet | 428/318.6 |
| 6,265,045 B1 | 7/2001 | Mushaben | |
| 6,268,062 B1 * | 7/2001 | DeMeuse | 428/461 |
| 6,270,912 B1 * | 8/2001 | Peet | 428/517 |
| 6,329,454 B1 * | 12/2001 | Krabbenborg | 524/252 |
| 6,355,200 B1 | 3/2002 | Schmidt et al. | |
| 6,399,531 B1 * | 6/2002 | Job et al. | 502/104 |
| 6,403,717 B1 | 6/2002 | Adams et al. | |
| 6,444,302 B1 | 9/2002 | Srinivas et al. | |
| 6,475,591 B2 | 11/2002 | Mushaben | |
| 6,518,208 B2 | 2/2003 | Terakawa | |
| 6,586,354 B1 | 7/2003 | Topolkaraev et al. | |
| 6,680,265 B1 * | 1/2004 | Smith et al. | 442/401 |
| 6,706,228 B2 | 3/2004 | Mackay | |
| 2002/0004350 A1 * | 1/2002 | Morman et al. | 442/381 |
| 2002/0006482 A1 | 1/2002 | Falla et al. | |
| 2003/0050618 A1 | 3/2003 | Kondo et al. | |
| 2004/0021251 A1 * | 2/2004 | Wheat et al. | 264/290.2 |
| 2004/0087235 A1 * | 5/2004 | Morman et al. | 442/394 |
| 2004/0091752 A1 * | 5/2004 | Morman et al. | 428/910 |
| 2004/0110442 A1 * | 6/2004 | Rhim et al. | 442/361 |
| 2004/0122408 A1 * | 6/2004 | Potnis et al. | 604/385.24 |
| 2004/0127131 A1 * | 7/2004 | Potnis | 442/394 |
| 2004/0135286 A1 | 7/2004 | Ying et al. | |
| 2005/0042962 A1 | 2/2005 | McCormack et al. | |
| 2005/0043460 A1 | 2/2005 | McCormack et al. | |

FOREIGN PATENT DOCUMENTS

| | | |
|---|---|---|
| DE | 25 03 775 | 8/1976 |
| EP | 0 068 659 | 1/1983 |
| EP | 0 419 742 A1 | 4/1991 |
| EP | 0 432 755 B1 | 6/1991 |
| EP | 0 452 727 B1 | 10/1991 |
| EP | 0 341 993 | 8/1993 |
| EP | 0 602 613 B1 | 6/1994 |
| EP | 676 418 | 10/1995 |
| EP | 747 402 | 12/1996 |
| EP | 0 800 808 A1 | 10/1997 |
| EP | 0 714 351 | 12/1998 |
| EP | 1 091 968 | 4/2001 |
| GB | 2 103 537 A | 2/1983 |
| GB | 2 115 702 A | 9/1983 |
| JP | 62-78214 | 4/1987 |
| JP | 07-002922 | 1/1995 |
| JP | 08-003203 | 1/1996 |
| JP | 08-041118 | 2/1996 |
| JP | 08-231625 | 9/1996 |
| JP | 09241961 A | 9/1997 |
| JP | 2001261868 | 9/2001 |
| JP | 2002069812 | 3/2002 |
| WO | WO 92/01401 | 2/1992 |
| WO | WO 93/15251 | 8/1993 |
| WO | WO 94/00292 | 1/1994 |
| WO | WO 97/02133 | 1/1997 |
| WO | WO 97/49848 | 12/1997 |
| WO | WO 98/02610 | 1/1998 |
| WO | 98/04397 | 2/1998 |
| WO | 98/05501 | 2/1998 |
| WO | WO 98/05502 | 2/1998 |
| WO | WO 98/29481 | 7/1998 |
| WO | WO 98/29504 | 7/1998 |
| WO | WO 98/31318 | 7/1998 |
| WO | WO 98/48091 | 10/1998 |
| WO | WO 98/51475 | 11/1998 |
| WO | WO 99/37840 | 7/1999 |
| WO | WO 00/08243 | 2/2000 |
| WO | WO 00/28123 | 5/2000 |
| WO | WO 00/29199 | 5/2000 |
| WO | WO 00/48834 * | 8/2000 |
| WO | WO 00/76445 | 12/2000 |
| WO | WO 00/76446 | 12/2000 |
| WO | 01/12306 | 2/2001 |
| WO | WO 01/14627 | 3/2001 |
| WO | 01/19592 A1 | 3/2001 |
| WO | WO 01/23180 | 4/2001 |
| WO | 01/40358 | 6/2001 |
| WO | WO 01/83599 * | 11/2001 |
| WO | WO 02/100207 | 12/2002 |
| WO | 03/057106 A1 | 7/2003 |

OTHER PUBLICATIONS

"Fibers", Cargill Dow, Internet web page, "http://www.cargilldow.com/fibers.asp", viewed and printed Jul. 23, 2002, pp. 1–4.

"PLA Processing Guide for Bulked Continuous Filament (BCF)," Cargill Dow, Internet web page, "http://www.cargilldow.com/pdf/fiberguide.html", viewed and printed Jul. 23, 2002, pp. 1–3.

Lunt, James and Andrew L. Shafer, "Polylactic Acid Polymers from Com. Applications in the Textiles Industry", Journal of Industrial Textiles, vol. 29, No. 3, Jan. 2000, pp. 191–205 (reprint pp. 1–8).

*Encyclopedia of Polymer Science and Engineering*, Wiley & Sons, vol. 10, 211–212, 1987.

\* cited by examiner

*Primary Examiner*—D. Lawrence Tarazano
(74) *Attorney, Agent, or Firm*—Pauley Petersen & Erickson (57) ABSTRACT

A film formed from a two-component single resin including two components, not blended or co-polymerized, but interpolymerized. The two components may have different densities and/or different melt indexes, with the resulting resin having properties of a blend of the two components but with improved durability and improved cross-directional extension properties compared to a conventional blend. The two components may be linear low density polyethylene and a metallocene-catalyzed polymer, for example. The film may also include calcium carbonate to provide breathability. The film has a more uniform cross-directional gauge profile and can be extended more uniformly. The film has cross-direction extensibility at a low force, for example, between about 25% and about 50% at a force below 500 grams per 3 inches.

51 Claims, 2 Drawing Sheets

BREATHABLE, EXTENSIBLE FILMS MADE WITH TWO-COMPONENT SINGLE RESINS

BACKGROUND OF THE INVENTION

This invention is directed to a film formed from a two-component single resin including two components, not blended or co-polymerized, but inter-polymerized. A film formed from the resin has cross-direction extensibility at a low force, for example, between about 25% and about 50% at a force below 500 grams per 3 inches.

Films made from a blend of two components are typically known for maintaining the characteristics of both components as well as for their durability. However, such blended resins have a tendency to split apart after machine direction orientation. Another drawback to blended resins is that separate domains tend to form in a cross-directional gauge profile of the film, thereby resulting in non-uniform stretching of the film which can cause the tendency for the film to split apart.

Films made of a blend of linear low density resins and metallocene resins have improved durability and split resistance after machine direction orientation. However, in such a blend the domains may have a tendency to separate which could result in non-uniform stretching in the cross direction.

Two common types of film formulation approaches for making breathable films are a concentrate letdown approach and a fully compounded approach. In a concentrate letdown process, one resin is used as a carrier resin to make a concentrate with calcium carbonate or other fillers. The carrier resin, typically a high melt index/low viscosity resin, is used to disperse high loadings of filler. The concentrate is let down with another resin, typically a low melt index/high viscosity resin, to dilute the calcium carbonate to a desired percentage. Using two different resins in this manner can present difficulty in maintaining a desired component ratio in the film formulation when required for extensible attributes.

Conventional films require between about 550 and about 800 grams of force, or higher, per 3 inches to extend the film in a cross-direction by about 25% to about 50%. Although this is not an overwhelming amount of force, it is nevertheless desirable to have a film that can be stretched 25–50% in a cross-direction under considerably less force, particularly in such applications as diaper backsheets, training pant outer covers, and other absorbent garments that are designed to conform to a wearer's body. Better fit performance can be achieved through extensibility at a lower force.

There is thus a need or desire for a film formed from a resin having the attributes of two precursor resins, which has uniformity and thermal stability not typically achieved by blended polymers, and extensibility at a low force.

There is a further need or desire for a single resin that can be used to make breathable films in both a concentrate letdown approach and a fully compounded approach.

SUMMARY OF THE INVENTION

In response to the discussed difficulties and problems encountered in the prior art, a film formed from a two-component single resin having cross-direction extensibility at a low force, has been discovered.

The present invention is directed to a film formed from a two-component single resin that includes two components each having a different density, for example, one having a density of at least 0.9 and the other having a density of 0.9 or lower. The first component has a melt index between about 2 and about 10 with a melting point between about 100 and about 120 degrees Celsius, while the second component has a melt index between about 1 and about 12 with a melting point between about 50 and about 95 degrees Celsius. The two components are suitably present in a ratio of between about 2:1 and about 1:2. The film has cross-direction extensibility at a low force, suitably with between about 25% and about 50% cross-direction extensibility at a force below 500 grams per 3 inches.

In the polymer matrix of the film of the invention, one of the components of the resin, or about 33% to about 66% of the resin, may be a linear low density component, such as linear low density polyethylene. Another component of the resin, or about 33% to about 66% of the film, may be a metallocene-catalyzed compound. To lend breathability to the film, the resin may also include between about 40% and about 60% by weight calcium carbonate.

The resulting film would render a uniform cross-sectional gauge profile with uniform cross-directional extensibility. In addition, the resin used to make the film of the invention suitably maintains the attributes of both pre-cursor resins, with a density of between about 0.85 and about 0.91, a melt index (MI) between about 2.5 and about 12, two melting peaks, one between about 50 and about 95 degrees Celsius and another between about 100 and about 120 degrees Celsius, and, when a filler is included, a water-vapor transmission rate of between about 1,000 and about 20,000 grams/$m^2$-24 hours, depending on carbonate level. The resulting film may also have some degree of retraction.

The resin can be used as both a carrier (6–12 MI) and a letdown (2.5–6 MI) in a concentrate letdown film-formulation approach, thereby easily maintaining a desired component ratio in the film formulation. Furthermore, the film can be produced using a fully compounded film-formulation approach.

A breathable laminate can be formed by combining at least one layer of the film formed from the resin with at least one nonwoven layer. The film, and/or laminate including the film, can be used in a wide variety of personal care absorbent articles and protective garments. In one embodiment, the film and/or laminate is used as a backsheet in a disposable diaper or other pant-like absorbent garment, or in protective wear, medical garments, industrial products, car covers, and the like.

With the foregoing in mind, particular embodiments of the invention provide a film formed from a two-component single resin having the attributes of the resin pre-cursors with cross-direction extensibility at a low force.

DEFINITIONS

Within the context of this specification, each term or phrase below will include the following meaning or meanings.

"Bonded" and "bonding" refer to the joining, adhering, connecting, attaching, or the like, of two elements. Two elements will be considered to be bonded together when they are bonded directly to one another or indirectly to one another, such as when each is directly bonded to intermediate elements.

"Breathable film," "breathable laminate" or "breathable outer cover material" refer to a film, laminate, or outer cover material having a water vapor transmission rate ("WVTR") of at least about 500 grams/m²-24 hours, using the WVTR Test Procedure described herein. The term "higher breathability" simply means that a second material has a higher WVTR than a first material. Breathable materials typically rely on molecular diffusion of vapor, or vapor passage through micropores, and are substantially liquid impermeable.

"Elastomeric" or "elastic" refers to a material or composite which can be elongated by at least 25 percent of its relaxed length and which will recover, upon release of the applied force, at least 10 percent of its elongation. It is generally preferred that the elastomeric material or composite be capable of being elongated by at least 100 percent, more preferably by at least 300 percent, of its relaxed length and recover, upon release of an applied force, at least 50 percent of its elongation.

"Extendible" and "extensible" are used interchangeably herein to mean a material which upon application of a stretching force, can be extended in a particular direction (e.g., the cross-direction), to a stretched dimension (e.g., width) which is at least 25% greater than an original, unstretched dimension. When the stretching force is removed after a one-minute holding period, the material preferably does not retract, or retracts by less than 30% of the difference between the stretched dimension and the original dimension. Thus, a material having a width of one meter, which is extendible in the cross direction, can be stretched to a width of at least 1.25 meters. When the stretching force is released, after holding the extended width for one minute, a material stretched to a width of 1.25 meters will preferably not retract, or will retract to a width of not less than 1.175 meters. Extendible materials are different from elastic materials, the latter tending to retract most of the way to their original dimension when a stretching force is released. The stretching force can be any force sufficient to extend the material to between 125% of its original dimension and its maximum stretched dimension in the selected direction (e.g., the cross direction) without rupturing it.

"Film" refers to a thermoplastic film made using a film extrusion process, such as a cast film or blown film extrusion process. This term includes films rendered microporous by mixing polymer with filler, forming a film from the mixture, and stretching the film.

"Garment" includes pant-like absorbent garments and medical and industrial protective garments. The term "pant-like absorbent garment" includes without limitation diapers, training pants, swim wear, absorbent underpants, baby wipes, adult incontinence products, and feminine hygiene products. The term "medical protective garment" includes without limitation surgical garments, gowns, aprons, face masks, and drapes. The term "industrial protective garment" includes without limitation protective uniforms and workwear.

"Linear low density polyethylene (LLDPE)" refers to polymers of ethylene and higher alpha-olefin comonomers such as $C_3$–$C_{12}$ comonomers, and combinations thereof, having a density of about 0.900 to 0.935 g/cm³.

"Machine direction" as applied to a film, refers to the direction on the film that was parallel to the direction of travel of the film as it left the extrusion or forming apparatus. If the film passed between nip rollers or chill rollers, for instance, the machine direction is the direction on the film that was parallel to the surface movement of the rollers when in contact with the film. "Cross direction" refers to the direction perpendicular to the machine direction. Dimensions measured in the cross direction are referred to as "width" dimensions, while dimensions measured in the machine direction are referred to as "length" dimensions.

"Meltblown fibers" are fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 1.0 denier, and are generally self bonding when deposited onto a collecting surface.

"Microporous" refers to films having voids separated by thin polymer membranes and films having micropores passing through the films. The voids or micropores can be formed when a mixture of polymer and filler is extruded into a film and the film is stretched, preferably uniaxially in the machine direction. Microporous films tend to have water vapor transmission due to molecular diffusion of water vapor through the membranes or micropores, but substantially block the passage of aqueous liquids.

"Neck" or "neck stretch" interchangeably mean that the fabric, nonwoven web or laminate is drawn such that it is extended under conditions reducing its width or its transverse dimension by stretching lengthwise or increasing the length of the fabric. The controlled drawing may take place under cool temperatures, room temperature or greater temperatures and is limited to an increase in overall dimension in the direction being drawn up to the elongation required to break the fabric, nonwoven web or laminate, which in most cases is about 1.2 to 1.6 times. When relaxed, the fabric, nonwoven web or laminate does not return totally to its original dimensions. The necking process typically involves unwinding a sheet from a supply roll and passing it through a brake nip roll assembly driven at a given linear speed. A take-up roll or nip, operating at a linear speed higher than the brake nip roll, draws the fabric and generates the tension needed to elongate and neck the fabric. U.S. Pat. No. 4,965,122 issued to Morman, and commonly assigned to the assignee of the present invention, discloses a reversibly necked nonwoven material which may be formed by necking the material, then heating the necked material, followed by cooling and is incorporated herein by reference in its entirety. The heating of the necked material causes additional crystallization of the polymer giving it a partial heat set. If the necked material is a spunbond web, some of the fibers in the web may become crimped during the necking process, as explained in U.S. Pat. No. 4,965,122.

"Neckable material" or "neckable layer" means any material or layer which can be necked such as a nonwoven, woven, or knitted material, or a laminate containing one of them. As used herein, the term "necked material" refers to any material which has been drawn in at least one dimension, (e.g. lengthwise), reducing the transverse dimension, (e.g. width), such that when the drawing force is removed, the material can be pulled back to its original width. The necked material generally has a higher basis weight per unit area than the un-necked material. When the necked material is pulled back to its original width, it should have about the same basis weight as the un-necked material. This differs from stretching/orienting the film layer, during which the film is thinned and the basis weight is reduced. Preferred nonwoven webs for use in the invention are made from an inelastic polymer.

"Nonwoven" or "nonwoven web" refers to materials and webs of material having a structure of individual fibers or filaments which are interlaid, but not in an identifiable manner as in a knitted fabric. Nonwoven fabrics or webs have been formed from many processes such as, for example, meltblowing processes, spunbonding processes, air laying processes, coforming processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Retract" and "retractability" refer to a material's ability to recover a certain amount of its elongation upon release of an applied force.

"Spunbond fiber" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

These terms may be defined with additional language in the remaining portions of the specification.

DESCRIPTION OF PREFERRED EMBODIMENTS

The present invention is directed to a film formed from a two-component single resin having the attributes of two different resin pre-cursors from which the two-component single resin is made, with cross-direction extensibility at a low force. This resin, when compounded with $CaCO_3$ or other filler and formed into a film and stretched, develops microporosity in the film that leads to breathability.

DuPont Dow Elastomers uses a technology, described, for example, in U.S. Pat. No. 6,369,176 issued 09 Apr. 2002, to inter-polymerize two components in a single reactor to form a single resin. Such resins are available from Dow Chemical Company of Midland, Mich., under the tradename ELITE. More specifically, a Ziegler-Natta polymer is partially polymerized in one reactor while a metallocene-catalyzed compound is partially polymerized in another reactor. In a third reactor, the two polymers become part of each other, or inter-polymerized, as opposed to being blended or co-polymerized. The resins used in the films of the present invention are created using the same inter-polymerizing technology.

In one embodiment, the resins used to form the films of the present invention include two resin components, each having a different density, for example one having a higher density, suitably at least 0.9, and another having a lower density, suitably 0.9 or lower. The higher density component may be a linear low density component, such as linear low density polyethylene (LLDPE) or other linear low density polyolefin. The lower density component may be a metallocene-catalyzed compound. The two resin components may be combined in the single reactor in a ratio of between about 2:1 and about 1:2. Alternatively, the two-component single resin may include between about 33% and about 66% of the higher density component or linear low density polyolefin, and between about 33% and about 66% of the lower density component or metallocene-catalyzed component. The resulting resin behaves like a blend of the linear low density polyolefin and the metallocene-catalyzed component, with higher durability and cross-directional uniformity than a blend of the two components.

Olefin polymers made using metallocene, or single-site catalysts have a very narrow molecular weight range. Polydispersity numbers (Mw/Mn) of below 4 and even below 2 are possible for metallocene-produced polymers. These polymers also have a controlled short chain branching distribution compared to otherwise similar Ziegler-Natta produced type polymers. It is also possible using a metallocene catalyst system to control the isotacticity of the polymer quite closely. In general, polyethylene polymers and copolymers having a density of 0.900 grams/cc or greater tend to be less extendible, while those having a density below 0.900 grams/cc are more extendible. In general, polypropylene polymers and copolymers containing 0–10% of an ethylene or other alpha-olefin comonomer tend to be less extendible, while propylene-alpha olefin copolymers containing more than 10% comonomer are more extendible.

Commercial production of metallocene-catalyzed polymers is somewhat limited but growing. Such polymers are available from Exxon-Mobil Chemical Company of Baytown, Tex. under the trade name ACHIEVE for polypropylene based polymers and EXACT and EXCEED for polyethylene based polymers. Dow Chemical Company of Midland, Mich., has polymers commercially available under the name AFFINITY. These materials are believed to be produced using non-stereo selective metallocene catalysts. Exxon-Mobil generally refers to their catalyst technology as single site or metallocene catalysts while Dow refers to theirs as "constrained geometry" catalysts under the name INSITE to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade.

A particulate filler, such as calcium carbonate, can be compounded with, and preferably homogeneously disposed among, the two-component single resin to lend breathability to the resulting film. More specifically, when the resin is compounded with the filler, stretched on a machine direction orienter or biaxial stretcher or other suitable stretching device, and annealed to stabilize the film, microporosity develops within the resulting film which provides breathability. Voids that are formed around the filler particles when the film is stretched are separated from one another by thin polymer membranes which facilitate the transmission (i.e. diffusion) of water vapor while blocking the flow of liquid water. Suitably, between about 40% and about 60% by weight filler may be included in the resin. Results have indicated that films made with the resin of the invention can achieve breathability in the form of a water-vapor transmission rate (WVTR) in a range from about 1,000 to 20,000 grams/$m^2$-24 hours, and a targeted force of 270 to 450 grams/inch to produce 25% cross-direction extension. The higher the level of filler, the higher the WVTR, the lower the forces of extension at 25% for the same resin.

As an example, the two-component single resin may contain about 15% of AFFINITY EG8200 metallocene, available from Dow Chemical Company, or another resin having a density between about 0.85 and 0.9 g/cc available from Exxon-Mobil Chemical Company and/or Dow Chemical Company, and the balance a LLDPE such as Huntsman 3106, available from Huntsman Chemical Corporation in Odessa, Tex., or DOWLEX 2035, 2517, 2244, 3310, or 2045, each available from Dow Chemical Company. Alternatively, the two-component single resin can be made with other types of components or different ratios of the components. For example, instead of EG8200 (density 0.87 g/cc, melting point 63 degrees Celsius), the two-component single resin may include EG8411 (density 0.883 g/cc, melting point 70 degrees Celsius) or Dow AFFINITY PL1280 (density 0.90 g/cc, melting point 96 degrees Celsius) to improve the thermal response of the resin and the resulting film toward blocking in film rolls.

Conventional films typically extend 25% to about 50% in the cross-direction when a minimum force of 550–800 grams per 3 inches is exerted. When used in diaper backsheets and other absorbent article structures it is desirable for a film to extend in the cross-direction under less force in order to achieve better fit performance. Thus, the ratio of the two components in the resin can be changed from 2:1, which is used to achieve cross-direction extensibility of between about 25% and about 50% at a force of less than about 500, or less than about 400, or less than about 300 grams per 3 inches, to a ratio where the elastomeric metallocene is the higher percentage and would result in a breathable film exhibiting stretch and recovery properties. For example, at a ratio closer to 1:2, the resulting film has a lower density and lower melting point due to the greater presence of the metallocene, thus resulting in a film having a greater ability to retract.

An inverse relationship exists between the film's extensibility and filler level, which is related to breathability. Thus, films formed from a resin that includes less filler (43–46% for example) will consequently have low breathability (1500–2000 grams/$m^2$-24 hours) and cross-direction extensibility of between about 25% and about 50% at a force of about 420–450 grams per 3 inches. A film formed from a resin that includes a mid-range of filler (54–56% for example) will have moderate breathability (10,000–12,000 grams/$m^2$-24 hours) and cross-direction extensibility of between about 25% and about 50% at a force of about 300–350 grams per 3 inches. A film formed from a resin that includes considerable filler (58–60% for example) will have high breathability (18,000–20,000 grams/$m^2$-24 hours) and cross-direction extensibility of between about 25% and about 50% at a force of about 275–300 grams per 3 inches.

Melt index is a measure of how easily a resin flows, and can be determined using ASTM Standard D1238. The two components in the resin can have different melt index values in order to improve dispersion during the compounding of the filler into the resin, and also in order to improve flow during extrusion to reduce load on the extruder and to cast films at faster rates. More particularly, the two components, namely carrier and let down, can have the same density with two different melt indices, with the carrier having a melt index of about 6–12 MI and the let down having a melt index of about 2.5–6 MI. Melt index is inversely proportional to viscosity. Thus, a polymer having a high melt index has a low viscosity. Conversely, a polymer having a melt index of 2 or 3 is fairly viscous. Durability of the resin can be controlled through the melt index, with all other properties being equal. For example, in one embodiment, both components of the two-component single resin may have the same density, suitably around 0.9, and can have two different viscosities or melt indexes, for example melt indexes of 5 and 12. In an embodiment wherein the two-component single resin includes two components each having a different density, the higher density component or linear low density polyolefin suitably has a melt index between about 2 and about 10 and a melting point between about 100 and about 120 degrees Celsius, while the lower density component or metallocene-catalyzed component suitably has a melt index between about 1 and about 12, or between about 5 and about 10, and a melting point between about 50 and about 95 degrees Celsius.

The resulting film formed from the two-component single resin has the attributes of both pre-cursor resins and performs as well as, or better than, films formed from the two components separately. With two components each having a different density and a different melting point, the resulting two-component single resin used to form the film of the invention has improved homogeneity compared to a blended resin, with the two-component single resin having a uniform cross-directional gauge profile and uniform cross-directional extensibility. As used herein, the term "uniform cross-directional gauge profile" refers to a film having a cross-sectional profile taken along a random line parallel to the machine direction in which a roughly uniform distribution of both components and, optionally, the filler is apparent such that no clotting or isolated grouping of either component or filler is apparent. The term "uniform cross-direction extensibility," as used herein, refers to the ability to be extended uniformly in the cross-direction without the appearance of separate domains as in a two-component blend. The film of the invention, formed from the two-component single resin, is suitably machine-direction oriented with cross-direction extensibility of between about 25% and about 50% at a low force, such as below 500 grams per 3 inches, or below 400 grams per 3 inches, or below 350 grams per 3 inches, yet is breathable and more durable. The two-component single resin suitably has a melt index between about 2.5 and about 12, two melting peaks, one between about 50 and about 95 degrees Celsius and another between about 100 and about 120 degrees Celsius, and a density between about 0.85 and about 0.91.

The two-component single resin can beneficially be used as both a carrier and a letdown in a concentrate letdown film-formulation approach. More specifically, this single resin can be used as a carrier to make a concentrate with the calcium carbonate up to about 75% loading, and can be let down with the same resin to dilute the calcium carbonate to the desired percentage, such as to about 55%. By using one resin that has the attributes of two components, a constant component ratio can be maintained throughout the film formulation. The two-component single resin can also be used in a fully compounded film-formulation approach.

Figure 1:
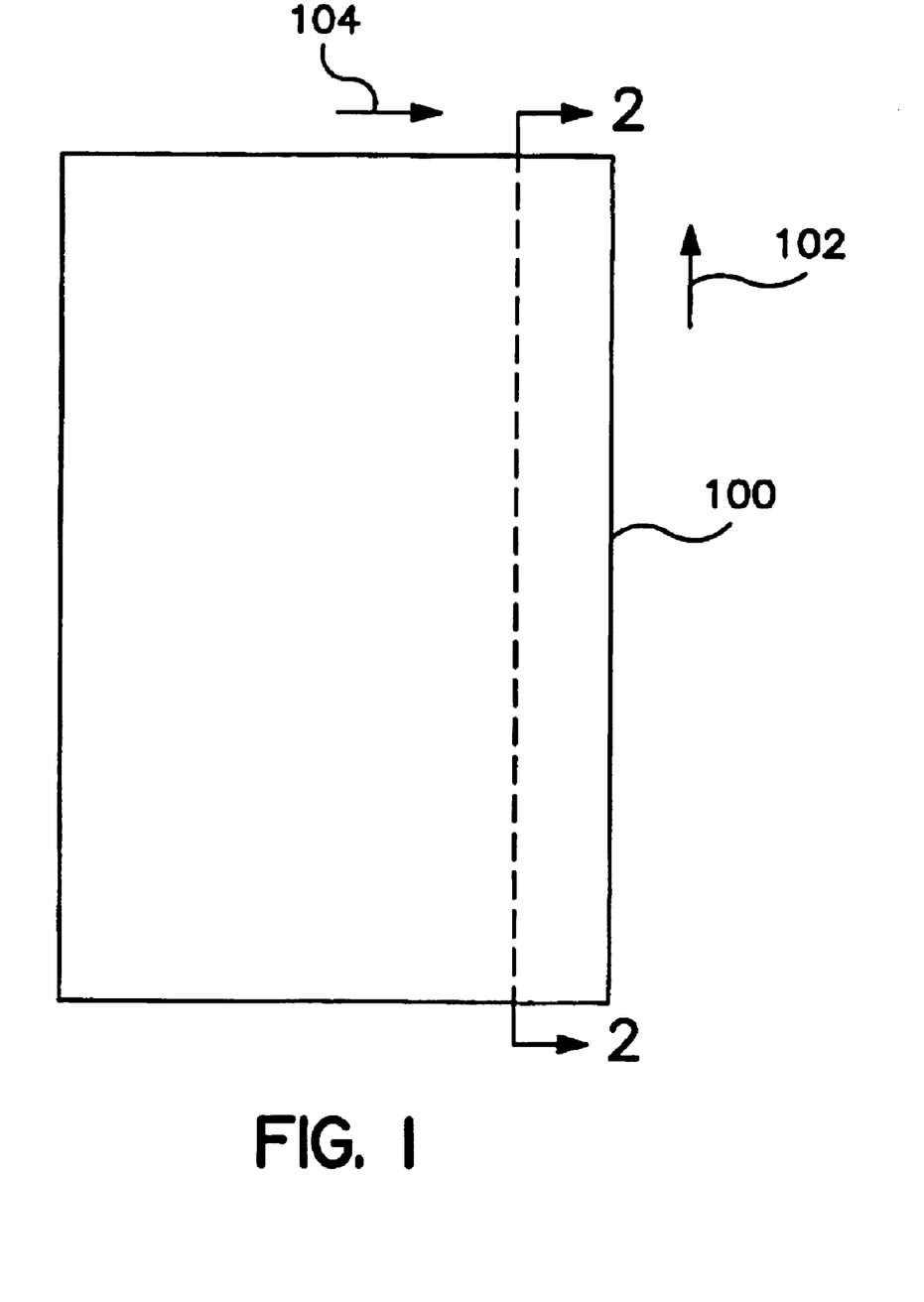
FIG. 1 is a top plan view of a microporous film of the invention in a relaxed state.
Figure 2:
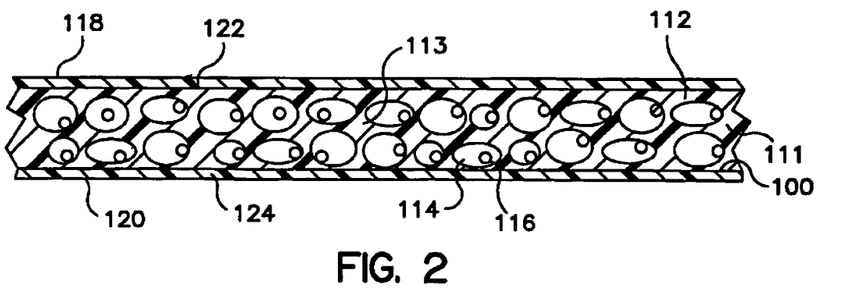
FIG. 2 is a sectional view of a microporous film, taken along line 2—2 in FIG. 1.

FIGS. 1 and 2 illustrate a film 100 of the invention. Referring to FIG. 1, the film 100 has a machine direction 102 and a cross-direction 104. The film 100 as shown in FIG. 1 is in a relaxed, unextended state. FIG. 2 illustrates a cross-section of a breathable extendible microporous film 100 that can be laminated to a nonwoven web to form a breathable laminate, as described below. The breathable microporous film 100 can include a primary microporous core layer 112 formed from the two-component single resin described above. The breathable layer 112 may be combined with two thinner skin layers 122 and 124 which are used for bonding. Alternatively, the film 100 may include a primary microporous core layer 112, and only one skin layer 122 or 124, or no skin layers. A film of this invention can be adhesively laminated.

The microporous layer 112 includes a polymer matrix 111 made up of the two-component single resin, a plurality of voids 114 within the matrix surrounded by relatively thin microporous membranes 113 defining tortuous paths, and one or more filler particles 116 in each void 114. The layer 112 is microporous and breathable, wherein the microporous membranes 113 between the voids readily permit molecular diffusion of water vapor from a first surface 118 to a second surface 120 of the film 100. Alternatively, some or all of the micropores can pass through the film, or can be interconnected to provide through-passages.

The filler particles 116 can include any suitable inorganic or organic filler. The filler particles 116 are preferably small to produce micropores, in order to maintain liquid water barrier of the film 100. Generally, the filler particles should have a mean particle diameter of about 0.1–7.0 microns, preferably about 0.5–5.0 microns, most preferably about 0.8–2.0 microns. Suitable fillers include without limitation calcium carbonate, non-swellable clays, silica, alumina, barium sulfate, sodium carbonate, talc, magnesium sulfate, titanium dioxide, zeolites, aluminum sulfate, diatomaceous earth, magnesium sulfate, magnesium carbonate, barium carbonate, kaolin, mica, carbon, calcium oxide, magnesium oxide, aluminum hydroxide and polymer particles. Calcium carbonate is a presently preferred filler.

The filler particles 116 may be coated with a minor quantity (e.g. up to 2% by weight) of a fatty acid or other material to ease their dispersion in the polymer matrix. Suitable fatty acids include without limitation stearic acid, or a larger chain fatty acid such as behenic acid.

The polymer composition, filler content, filler particle size and degree of stretching are factors which help determine the breathability, extensibility, and liquid barrier of the extendible microporous film 100 in the laminate. Generally, the oriented microporous film 100 will be less than about 50 microns thick, preferably less than about 30 microns thick, most preferably less than about 20 microns thick. In some cases, during inline lamination, the film may be between about 12 and about 15 microns thick. The film 100 may be uniaxially stretched in the machine direction to about 1.1–6.0 times its original length to cause breathability, preferably to about 1.5–5.0 times its original length, most preferably to about 2.5–4.5 times its original length prior to lamination to a nonwoven web. Stretching temperatures may range from about 38–150 C depending on the specific polymers employed, and are preferably about 70–95 C. The film 100 can be prepared by cast or blown film coextrusion of the layers, by extrusion coating, or by any conventional layering process.

In the embodiment of FIG. 2, the microporous breathable film layer 112 is adjacent one or two relatively thin outer skin layers 122 and 124, in a two or three-layer extendible film 100. The inclusion of one or two skin layers can contribute to heat seal properties required for thermal bonding to produce a breathable laminate. The polymers in the outer layers 122 and 124 can be the same or different than the polymers in the microporous layer 112. Preferably, the polymers in the outer layer or layers are extendible, have a lower softening point than in the microporous layer 112, and contribute to the heat sealability of the film 100. To facilitate breathability, the skin layers 122 and 124 may contain a particulate filler in any quantity up to the same amount as the microporous core layer 112, and the skin layers may be microporous as well after the film is machine direction orientated.

In a typical case, the film 100 will be oriented only in the machine direction before being laminated to a nonwoven web, and could be stretched slightly in the cross-direction, before and after lamination to yield increased breathability and durability. If stretching the laminate after lamination, then the nonwoven web must also be capable of extending in the cross-direction, to accommodate the stretching of the film. Typically, the film and nonwoven web will be bonded together with the machine direction of the film substantially aligned with the machine direction of the nonwoven web. The bonding may be accomplished using any technique which minimizes disruption of the moisture vapor transmission through the film. Suitable techniques include thermal point bonding, ultrasonic point bonding, adhesive pattern bonding, adhesive spray bonding, and other techniques where the bonded areas cover preferably less than about 25% of the interface between the film and nonwoven web.

Figure 3:
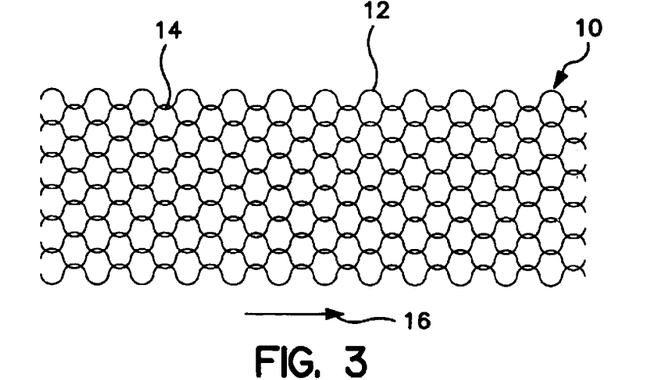
FIG. 3 illustrates a top view of a fibrous nonwoven web, which can be a spunbond web, which has not been necked.

A variety of nonwoven webs are suitable for use in the laminate of the invention. Referring to FIG. 3, a nonwoven web 10, which can be a spunbond web, includes a plurality of individual thermoplastic fiber elements 12 intermittently bonded together using a bonding pattern which, in this instance, includes a plurality of point bonds 14. The individual fibers 12 appear to have a wavy or somewhat random orientation when viewed on a microscopic scale. When viewed on a macroscopic scale, so that the entire lengths of fibers 12 are visible, the fibers 12 have an overall primary direction of orientation which is parallel to a machine direction, represented by arrow 16. A more extensible nonwoven with cross-direction extensibility may be beneficial.

Figure 4:
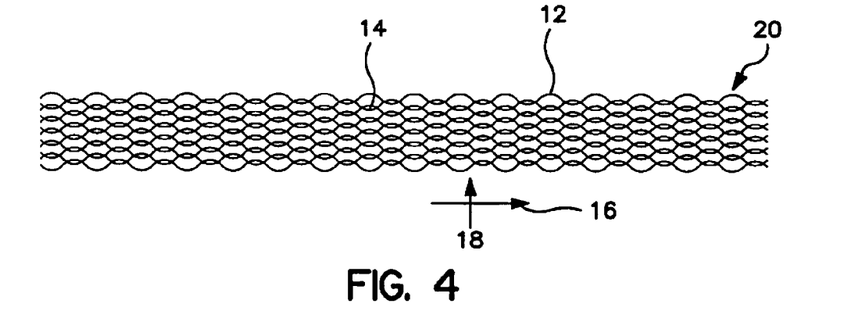
FIG. 4 illustrates a top view of a fibrous nonwoven web, which can be a spunbond web, which has been necked.

The nonwoven web is preferably a spunbond web, but can also be a meltblown web, a bonded carded web, an air laid web, or a laminate or composite including one or more nonwoven webs. The nonwoven web may also be formed or modified using a hydraulic entangling process. In one embodiment, the nonwoven web or composite including it, is neckable, as defined above. FIG. 4 illustrates a top view of a necked nonwoven material 20, which can be the nonwoven web 10 stretched in the machine direction 16 prior to lamination to the film 100, to cause elongation of the web in the machine direction 16 and narrowing, or neck-in, in the cross direction 18. As shown in FIG. 4, necking causes the individual filaments 12 to become more aligned with each other, and closer to each other. When a neckable nonwoven web or composite is employed, it should have a percent neck-down of at least about 15%, more preferably about 25–75%, most preferably about 35–65%. Prior to necking, the nonwoven web 10 should have a basis weight of about 0.05–4.0 ounces per square yard. ("osy"), preferably about 0.3–2.0 osy, more preferably about 0.4–1.0 osy.

When a neckable nonwoven web is used, the nonwoven web can be constructed from either a variety of polymers. Examples of suitable non-extendible and less extendible polymers include, without limitation, certain polyolefins, polyamides, and polyesters. Preferred polymers (whether extendible or not) include polyolefins, such as polypropylene and/or polyethylene. Other suitable polymers include linear low density polyethylene copolymers, and copolymers of propylene with up to about 10% by weight of a $C_2$ or $C_4$–$C_{12}$ alpha-olefin comonomer.

In another embodiment, the nonwoven web 10 is made of an extendible polymer composition, and need not be necked prior to lamination with the film 100. Suitable polymers include, without limitation, any of the extendible polymers listed above for the two-component single resin. The extendible fibers 12 may be composed of a blend or other combination of an extendible and non-extendible polymer, so long as the extendible polymer is present in sufficient quantity to render the nonwoven web extendible in the cross-direction.

In a third embodiment, the cross direction extendible nonwoven web 10 is made of fibers 12 that are crimped. A wide variety of crimping processes are known in the art. Crimped fibers have accordion-like or spring-like undulations or microundulations so that when the fibers are extended, they straighten out and/or the undulations are reduced in amplitude. When crimped fibers are used, the polymer of construction need not be extendible, i.e., may be extendible or not extendible.

In yet another embodiment, the nonwoven is formed so that the fibers have very high machine direction (MD) and very little cross direction (CD) orientation. The fibers are then bonded so as to minimize CD bonding of the fibers. This allows the material to extended in the CD. An example of such a material is a bonded carded web (BCW) nonwoven that has high CD extensibility and low MD extensibility. Other nonwovens, such as spunbonds, can be made to perform like BCW's by forming the spunbond fibers so that the fibers are highly oriented in the MD and bond the filaments with a bond pattern so that the material can readily extend in the CD. Such a bond pattern would have lower percent bond area (less than 25%) with the bonds lined up predominately in the MD. Thus there are columns of fibers in the MD which are not bonded adjacent to columns of fibers in the MD that are. The unbonded fibers allow the nonwoven to readily extend in the CD while the bonded fibers give the material strength and abrasion resistance. BCW materials are described further in *Encyclopedia of Polymer Science and Engineering*, Vol. 10, Pages 211–212, Wiley & Sons (1987), which is incorporated by reference.

Any nonwoven web is suitable so long as it accommodates the cross-directional stretching of the film in the laminate. A necked nonwoven web accomplishes this by returning toward its original, pre-necked state during cross-directional stretching of the laminate. A web made of extendible polymer simply stretches in the cross-direction with the film. A web of crimped fibers extends in the cross-direction by straightening out the fibers. A web with high machine direction orientation can extend in the cross-direction by increasing the spacing between unbonded portions of adjacent fibers.

The nonwoven web should be selected so as not to substantially impair or lower the WVTR contributed by the film. The bonding technique between the film and web should also be selected so that not more than about 15–25% of the interface between the film and web is covered with adhesive or thermally bonded regions, so as not to substantially impair the WVTR.

The film formed from the two-component single resin, as well as the cross-direction extendible, breathable laminate including the film, may be used in a variety of pant-like absorbent garments, including without limitation diapers, training pants, swimwear, absorbent underpants, adult incontinence products, feminine hygiene products, and the like. The film formed from the two-component single resin, as well as the cross-direction extendible, breathable laminate including the film, can also be used in protective garments, including medical garments and industrial protective garments. Medical garments include surgical garments, gowns, aprons, face masks, absorbent drapes, and the like. Industrial protective garments include protective uniforms, workwear, and the like.

EXAMPLES

Example 1

In this example, 4 films each formed from a two-component single resin, in accordance with the invention, differing in terms of skin composition, melt index, and percentage filler, were created using a concentrate letdown approach and were tested for water-vapor breathability and cross-direction extensibility. The composition of each sample is provided in Table 1. Both the carrier resin and the let down resin in each sample had a density of 0.905 g/cc.

TABLE 1

Two-Component Single Resin Sample Compositions

| Sample | Skin | Carrier Resin Melt Index (MI) | Concentrate (%) | $CaCO_3$ (%) | Let Down Resin MI/% |
|---|---|---|---|---|---|
| 1 | SCC 20740 | 10 MI | 77 | 58 | 5 MI/23% |
| 2 | LQA-006 | 10 MI | 74 | 55.5 | 5 MI/25% |
| 3 | LQA-006 | 10 MI | 74 | 55.5 | 10 MI/25% |
| 4 | LQA-006 | 10 MI | 77 | 58 | 10 MI/23% |

The carrier and the letdowns were added directly into an extruder with the percentage filler concentrate indicated in Table 1 to get the percentage $CaCO_3$ filler indicated in Table 1. The skin compositions included Standridge Color Corp. (SCC) 20740, which is a blend of ethylene vinyl acetate (EVA) and a catalloy and is available from Bassel, or LQA-006, which is a low density polyethylene (LDPE), which is available from Exxon Mobil.

Films of the resin were cast on a pilot line. The films were stretched on a machine-direction orienter with a 4× stretch ratio to achieve a WVTR from 10,000 to 18,000 grams/m$^2$-24 hours, depending on the calcium carbonate percentage.

As can be seen in Table 2, the resins with high percentages of filler (Samples 1 and 4) had considerably higher WVTR than resins with less filler (Samples 2 and 3). Also, comparing samples that had the same filler percentage but let down resins with different MI, such as Sample 1 versus Sample 4 and Sample 2 versus Sample 3, it can be seen in Table 2 that resins with lower let down MI (Samples 1 and 2) required more force to extend the film in the CD than resins with higher let down MI (Samples 3 and 4). Comparatively, the samples with higher let down MI were more durable than the samples with lower let down MI, as shown by the MD maximum elongation.

TABLE 2

Two-Component Single Resin Sample Characteristics

| Sample | Basis Weight (osy) | WVTR (grams/m²-24 hours) | MD Maximum Elongation (%) | CD Extensibility (gm load/3 inches @ 25%) |
|---|---|---|---|---|
| 1 | 20 | 16512 | 51 | 261 |
| 2 | 19.9 | 10358 | 68 | 342 |
| 3 | 19.5 | 14525 | 106 | 255 |
| 4 | 18.8 | 17967 | 65 | 195 |

Example 2

In this example, the effect of temperature on the resin during stretching was examined. The resin had a 10 MI carrier resin that was also used as the letdown. The resulting film was first stretched 400% (to 4 times the film's original length) in the machine direction at 150 degrees Fahrenheit at which point the WVTR was determined to be 21000 grams/m²-24 hours. In contrast, when the same film was stretched 400% at 160 degrees Fahrenheit, the WVTR was determined to be 28000 grams/m²-24 hours.

With filled films, the greater the film is stretched, the higher the porosity of the film. If the film is at a temperature that is too cold, the pores do not open well. However, if the film is at a temperature that is too hot, the pores tend to close. Thus, a temperature around 160 degrees Fahrenheit appears to be a suitable temperature at which to stretch the resins of the invention.

Example 3

In this example, the cross-direction uniformity of a film of the invention ("Film") was determined and compared to the cross-direction uniformity of a highly breathable stretch thermal laminate (HBSTL), both having about the same levels of carbonate with a target breathability of 10,000–12,000 grams/m²-24 hours. HBSTL materials are described in detail in U.S. Pat. No. 6,276,032 issued to Nortman et al., incorporated herein by reference. The film was made up of a 5 MI resin, fully compounded. The HBSTL was made up of DOWLEX 2517 as the carrier (25 MI) easily extendible resin, and DOWLEX 2074A (2.3 MI) as the let down. Twenty-inch wide samples of both the film and the HBSTL were tested in 9 equally spaced sections across the width of the sample for WVTR, with position 1 being ⅑ of the width along one edge of the sample and position 9 being ⅑ of the width along the opposite edge of the sample. Results are shown in Table 3. As can be seen, for the film the WVTR varies by no more than about 4500 grams/m²-24 hours across the full width of the sample, while for the HBSTL the WVTR varies by up to 12,500 grams/m²-24 hours. Although the percentage WVTR change in both samples was about the same, the actual WVTR variability was much greater in the HBSTL sample which has greater overall breathability and greater cross-direction extensibility.

TABLE 3

| CD Uniformity | | |
|---|---|---|
| | WVTR (grams/m²-24 hours) | |
| Position | Film | HBSTL |
| 1 | 6000 | 19500 |
| 2 | 7000 | 25500 |
| 3 | 7500 | 29500 |
| 4 | 10500 | 30500 |
| 5 | 7500 | 28500 |
| 6 | 9000 | 29000 |
| 7 | 9500 | 25000 |
| 8 | 8500 | 22000 |
| 9 | 7500 | 18000 |

WVTR Test Procedure

A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be used. The purpose of the guard film is to define a definite air gap and to quiet or still the air gap while the air gap is characterized. The dry chamber, guard film, and the wet chamber make up a diffusion cell in which the test film is sealed. The sample holder is known as the Permatran-W Model 100K manufactured by Mocon/Modem Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer than calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:
WVTR: The calculation of the WVTR uses the formula:

$$WVTR = F\rho_{sat}(T)RH/A\rho_{sat}(T)(1-RH)$$

where:

F=The flow of water vapor in cc/min., $\rho_{sat}(T)$=The density of water in saturated air at temperature T, RH=The relative humidity at specified locations in the cell, A=The cross sectional area of the cell, and, $p_{sat}(T)$=The saturation vapor pressure of water vapor at temperature T.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A film formed from a two-component single resin, comprising:
    a first component having a density of at least 0.9; and
    a second component having a density of 0.9 or lower;
    wherein the two-component single resin includes the first component and the second component inter-polymerized in a ratio of between about 2:1 and about 1:2, and the film has cross-direction extensibility of between about 25% and about 50% at a force below 500 grams per 3 inches.

2. The film of claim 1, wherein the film has cross-direction extensibility of between about 25% and about 50% at a force below about 400 grams per 3 inches.

3. The film of claim 1, wherein the film has cross-direction extensibility of between about 25% and about 50% at a force below about 350 grams per 3 inches.

4. The film of claim 1, wherein the first component comprises a linear low density polyolefin.

5. The film of claim 1, wherein the second component comprises a metallocene-catalyzed polymer.

6. The film of claim 1, further comprising between about 40% and about 60% by weight calcium carbonate.

7. The film of claim 1, wherein the resin has a density of between about 0.85 and about 0.91.

8. The film of claim 1, having a water-vapor transmission rate of between about 1,000 and about 20,000 grams/$m^2$-24 hours.

9. The film of claim 1, wherein the first component has a melt index between about 2 and about 10.

10. The film of claim 1, wherein the second component has a melt index between about 1 and about 12.

11. The film of claim 1, wherein the resin has a melt index between about 2.5 and about 12.

12. The film of claim 1, wherein the film has a uniform cross-directional gauge profile.

13. The film of claim 1, wherein the film has uniform cross-direction extensibility.

14. The film of claim 1, wherein the first component has a melting point between about 100 and about 120 degrees Celsius.

15. The film of claim 1, wherein the second component has a melting point between about 50 and about 95 degrees Celsius.

16. The film of claim 1, wherein the resin has two melting peaks, one melting peak between about 50 and about 95 degrees Celsius and one melting peak between about 100 and about 120 degrees Celsius.

17. The film of claim 1, wherein the resin can be used as both a carrier and a letdown in a concentrate letdown film-formulation approach.

18. The film of claim 1, wherein the resin can be used in a fully compounded film-formulation approach.

19. A laminate comprising at least one nonwoven layer and at least one layer of the film of claim 1.

20. A breathable film formed from a two-component single resin, comprising:
    a linear low density component;
    a metallocene-catalyzed component; and
    between about 40% and about 60% by weight calcium carbonate;
    wherein the resin includes the linear low density component and the metallocene-catalyzed component inter-polymerized in a ratio of about 2:1, and the film has cross-direction extensibility of between about 25% and about 50% at a force below 500 grams per 3 inches.

21. The film of claim 20, wherein the film has cross-direction extensibility of between about 25% and about 50% at a force below about 400 grams per 3 inches.

22. The film of claim 20, wherein the film has cross-direction extensibility of between about 25% and about 50% at a force below about 350 grams per 3 inches.

23. The film of claim 20, wherein the resin has a density of between about 0.85 and about 0.91.

24. The film of claim 20, having a water-vapor transmission rate of between about 1,000 and about 20,000 grams/$m^2$-24 hours.

25. The film of claim 20, wherein the linear low density component has a melt index between about 2 and about 10.

26. The film of claim 20, wherein the metallocene-catalyzed component has a melt index between about 1 and about 12.

27. The film of claim 20, wherein the two-component single resin has a melt index between about 2.5 and about 12.

28. The film of claim 20, wherein the film has a uniform cross-directional gauge profile.

29. The film of claim 20, wherein the film has uniform cross-direction extensibility.

30. The film of claim 20, wherein the linear low density component has a melting point between about 100 and about 120 degrees Celsius.

31. The film of claim 20, wherein the metallocene-catalyzed component has a melting point between about 50 and about 95 degrees Celsius.

32. The film of claim 20, wherein the resin has two melting peaks, one melting peak between about 50 and about 95 degrees Celsius and one melting peak between about 100 and about 120 degrees Celsius.

33. The film of claim 20, wherein the resin can be used as both a carrier and a letdown in a concentrate letdown film-formulation approach.

34. The film of claim 20, wherein the resin can be used in a fully compounded film-formulation approach.

35. A laminate comprising at least one nonwoven layer and at least one layer of the film of claim 20.

36. A breathable film formed from a two-component single resin, comprising:
    between about 33% and about 66% linear low density polyethylene inter-polymerized with between about 33% and about 66% metallocene-catalyzed polymer;
    to which between about 40% and about 60% by weight calcium carbonate is added;
    wherein the film has cross-direction extensibility of between about 25% and about 50% at a force below 500 grams per 3 inch.

37. The film of claim 36, wherein the film has cross-direction extensibility of between about 25% and about 50% at a force below about 400 grams per 3 inches.

38. The film of claim 36, wherein the film has cross-direction extensibility of between about 25% and about 50% at a force below about 350 grams per 3 inches.

39. The film of claim 36, wherein the resin has a density of between about 0.85 and about 0.91.

40. The film of claim 36, having a water-vapor transmission rate of between about 1,000 and about 20,000 grams/m$^2$-24 hours.

41. The film of claim 36, wherein the linear low density polyethylene has a melt index between about 2 and about 10.

42. The film of claim 36, wherein the metallocene-catalyzed polymer has a melt index between about 1 and about 12.

43. The film of claim 36, wherein the two-component single resin has a melt index between about 2.5 and about 12.

44. The film of claim 36, wherein the film has a uniform cross-directional gauge profile.

45. The film of claim 36, wherein the film has uniform cross-direction extensibility.

46. The film of claim 36, wherein the linear low density polyethylene has a melting point between about 100 and about 120 degrees Celsius.

47. The film of claim 36, wherein the metallocene-catalyzed polymer has a melting point between about 50 and about 95 degrees Celsius.

48. The film of claim 36, wherein the two-component single resin has two melting peaks, one melting peak between about 50 and about 95 degrees Celsius and one melting peak between about 100 and about 120 degrees Celsius.

49. The film of claim 36, wherein the resin can be used as both a carrier and a letdown in a concentrate letdown film-formulation approach.

50. The film of claim 36, wherein the resin can be used in a fully compounded film-formulation approach.

51. A laminate comprising at least one nonwoven layer and at least one layer of the film of claim 36.

* * * * *